(12) United States Patent
Frielinghaus et al.

(10) Patent No.: US 12,153,390 B2
(45) Date of Patent: *Nov. 26, 2024

(54) METHOD FOR OPERATING A KITCHEN SYSTEM, KITCHEN SYSTEM FOR PREPARING FOOD, AND COMPUTER PROGRAM PRODUCT

(71) Applicant: Vorwerk & Co. Interholding GmbH, Wuppertal (DE)

(72) Inventors: Robert Frielinghaus, Bochum (DE); Stefan Kraut-Reinkober, Leverkusen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,220

(22) Filed: Oct. 18, 2023

(65) Prior Publication Data

US 2024/0045392 A1 Feb. 8, 2024

Related U.S. Application Data

(63) Continuation of application No. 17/206,780, filed on Mar. 19, 2021, now Pat. No. 11,822,304.

(30) Foreign Application Priority Data

Mar. 26, 2020 (EP) .................................... 20165869

(51) Int. Cl.
*G05B 19/042* (2006.01)
*G06F 16/903* (2019.01)

(52) U.S. Cl.
CPC ..... *G05B 19/042* (2013.01); *G06F 16/90335* (2019.01); *G05B 2219/2643* (2013.01)

(58) Field of Classification Search
USPC .......................................................... 700/28
See application file for complete search history.

(56) References Cited

U.S. PATENT DOCUMENTS

| 5,960,440 A | 9/1999 | Brenner et al. |
| 10,360,812 B2 | 7/2019 | Koennings et al. |
| (Continued) | | |

FOREIGN PATENT DOCUMENTS

| AU | 2017294574 A1 | 1/2019 |
| AU | 2016231185 B1 | 10/2019 |
| (Continued) | | |

OTHER PUBLICATIONS

Johnson, Lee, "How to Calculate the Time to Heat an Object" website (2018), (11 pages) original from https://web.archive.org/web/20190718022330/http://sciencing.com/calculate-time-heat-object-8223103.html (Year: 2018).*

(Continued)

*Primary Examiner* — Carlos R Ortiz Rodriguez
*Assistant Examiner* — Joshua T Sanders
(74) *Attorney, Agent, or Firm* — Jason H. Vick; Womble Bond Dickinson (US) LLP

(57) ABSTRACT

A technique to operating a kitchen system for at least partially automatic preparation of food, a kitchen system and a computer program product are proposed, wherein one or more preparation parameters for one or more preparation steps and/or one or more kitchen appliances of the kitchen system to be used for the preparation are determined, adjusted and/or selected automatically and using a database system.

9 Claims, 5 Drawing Sheets

(56) References Cited

U.S. PATENT DOCUMENTS

| | | | |
|---|---|---|---|
| 10,842,309 B2 | 11/2020 | Koennings et al. | |
| 2014/0272816 A1* | 9/2014 | Callahan | G06Q 30/0633 434/127 |
| 2017/0224149 A1 | 8/2017 | Koennings et al. | |
| 2017/0258273 A1* | 9/2017 | Stach | A47J 36/321 |
| 2018/0018903 A1* | 1/2018 | Koennings | G09B 19/0092 |
| 2019/0053332 A1 | 2/2019 | Cheng et al. | |
| 2019/0142222 A1* | 5/2019 | Resende | A47J 27/004 426/231 |
| 2021/0302928 A1 | 9/2021 | Frielinghaus et al. | |

FOREIGN PATENT DOCUMENTS

| | | | |
|---|---|---|---|
| CN | 107045301 A | 8/2017 | |
| CN | 107536454 | 1/2018 | |
| DE | 102014112251 A1 | 3/2016 | |
| DE | 102016110715 A1 * | 12/2017 | A47J 27/004 |
| EP | 3206096 A | 8/2017 | |
| EP | 3269280 A1 | 1/2018 | |
| FR | 2804519 A1 | 8/2001 | |
| KR | 101880914 B1 | 7/2018 | |
| WO | WO 2006/138360 A2 | 12/2006 | |
| WO | WO 2010/078828 A1 | 7/2010 | |
| WO | WO 2016/142405 A1 | 9/2016 | |
| WO | WO 2017/125749 A2 | 7/2017 | |
| WO | WO 2018/006182 A1 | 1/2018 | |

OTHER PUBLICATIONS

Ashrae Handbook—Refrigeration (SI); Chapter 9; "Thermal Properties of Foods" 2006.

Lee, Johnson "How to Calculate the Time to Heat an Object" Sciencing; Jun. 4, 2018.

Office Action for U.S. Appl. No. 17/206,780, mailed Oct. 28, 2022.

Office Action for U.S. Appl. No. 17/206,780, mailed Apr. 27, 2023.

Notice of Allowance for U.S. Appl. No. 17/206,780, mailed Jul. 19, 2023.

\* cited by examiner

METHOD FOR OPERATING A KITCHEN SYSTEM, KITCHEN SYSTEM FOR PREPARING FOOD, AND COMPUTER PROGRAM PRODUCT

CROSS-REFERENCE TO RELATED APPLICATIONS

This application is a Continuation of U.S. patent application Ser. No. 17/206,780, filed Mar. 19, 2021, now U.S. Pat. No. 11,822,304, which claims the benefit under 35 U.S.C. 119 (a) to European Patent Application No. 20 165 869.7, filed Mar. 26, 2020, the disclosures of which are incorporated herein by reference in their entirety.

SUMMARY

The present technology relates to a method for operating a kitchen system, a kitchen system for preparing food and a computer program product.

Electrically operated kitchen appliances are known from the prior art which carry out the preparation of food at least partially automatically on the basis of an electrically stored or digital recipe. For example, a user can select a recipe from a recipe database via a user interface of such a kitchen appliance. The user is then guided through the individual preparation steps, wherein one or more preparation steps are performed at least partially automatically by the kitchen appliance, depending on the functional scope of the kitchen appliance.

One exemplary object of the present technology is to provide an improved method for operating a kitchen system and an improved kitchen system for at least partially automatic preparation of food, wherein a simple, fast and/or reproducible preparation and/or processing of food is enabled or supported. In particular, by means of the method and the kitchen system, a simple, fast, (partially) automatic and/or reproducible preparation and/or processing of recipes with an (individually) adapted amount/quantity of the food shall be enabled or supported.

The problem is solved by a method, a kitchen system or a computer program product as disclosed herein.

The proposed kitchen system has one or more kitchen appliances for preparing and/or processing food. In particular, the proposed kitchen system is designed to prepare and/or process, by means of one or more kitchen appliances, one or more food items/ingredients into a meal and/or a dish.

A kitchen appliance in the sense of the present technology is a device for preparing food/meals/dishes and/or for processing, in particular for heating, chopping and/or mixing/stirring, food/ingredients. For example, a kitchen appliance in the sense of the present technology may be a stove, an oven, a microwave, a refrigerator, a kettle, a grill, a toaster, a cooking pot, a (frying) pan, a container, a bowl, a form, a tray or the like.

Preferably, at least one kitchen appliance of the kitchen system is designed as a kitchen machine for at least partially automatic preparation and/or processing, in particular for heating, chopping and/or mixing/stirring, of food.

A kitchen machine in the sense of the present technology is an electrically operated, in particular multifunctional, kitchen appliance that has one or more preparation functions, such as a heating, chopping and/or mixing/stirring of food. For this purpose, a kitchen machine may be equipped with an optional vessel for the food, an electric heating system for heating the food, and/or a stirrer for stirring/mixing and/or chopping the food.

However, a kitchen machine in the sense of the present technology may also be any other electrically operated kitchen appliance for preparing and/or processing, in particular for heating, food, such as a stove, an oven and/or a microwave.

A food in the sense of the present technology is preferably a foodstuff, aliment, nutritional product, beverage, drink and/or a luxury food for consumption. Food may be, for example, products of plant origin, such as vegetables, fruit and/or a (dried) grain product, and/or products of animal origin, such as eggs, meat products and/or dairy products.

A food in the sense of the present technology can be solid, liquid, viscous, mushy, pasty or the like.

A food in the sense of the present technology can be an initial, intermediate and/or final product for consumption and/or for a meal and/or a dish. In particular, a food in the sense of the present technology can form an ingredient for a dish and/or a meal and/or itself be formed by a plurality of foodstuffs and/or itself be a dish and/or meal.

The proposed kitchen system, in particular the kitchen machine of the kitchen system, preferably comprises a user interface, a data processing device and a control device.

The data processing device is preferably (in terms of data connections) connected or connectable to a (digital) recipe database with one or more (digital) recipes, a (digital) food database with at least one food parameter for one or more foods and/or a (digital) appliance database with at least one appliance parameter for a plurality of kitchen appliances.

Additionally or alternatively, the kitchen system or the kitchen machine, in particular a memory of the data processing device, may have the or an additional recipe database, food database and/or appliance database.

Via the user interface, a user can select a recipe from the recipe database to be executed and/or prepared by means of the kitchen system.

A database in the sense of the present technology is preferably a (digital) collection of data and/or of data sets with multiple data. Particularly preferably, a database in the sense of the present technology is designed as a relational and/or table-based database. In particular, a database in the sense of the present technology comprises at least one table and/or a (digital) collection of tables, in particular wherein the rows of the table each contain a data set and the columns of the table each contain at least one attribute.

Preferably, the recipe database, the food database and/or the appliance database are/is designed as a relational and/or table-based database and/or included in the (common) database system.

As explained above, the recipe database preferably has a plurality of recipes.

A recipe in the sense of the present technology is preferably a programmatic and/or digital instruction for the preparation and/or processing of food by means of the kitchen system and/or the kitchen machine, in particular for preparing a food (product), meal and/or dish and/or components thereof.

Preferably, a recipe in the sense of the present technology comprises one or more (sequential) preparation steps, each preparation step comprising one or more details, indications, items of information, values, characteristics and/or parameters concerning a food to be used and one or more details, indications, items of information, values, characteristics and/or parameters concerning a kitchen appliance to be used and/or an action to be performed, hereinafter referred to as preparation parameters. For example, a preparation step may comprise a (predetermined) indication of the amount/quantity of food to be used, hereinafter referred to as the recipe quantity, and as a (first) preparation parameter a temperature of a kitchen appliance to be set and as a (second) preparation parameter a time for which the quantity of food is to be exposed to the temperature.

A preparation parameter in the sense of the present technology may be selected from a time, in particular a heating time, a cooling time, a chopping time or a mixing time, from a temperature, in particular a heating temperature or cooling temperature, from a pressure, a rotational speed, in particular of an electric motor, and/or from a power, in particular a heating power or cooling power.

Particularly preferably, a recipe in the sense of the present technology is structured in tabular form and/or is designed as a (digital) table, in particular wherein each row and/or each data set contains at least or exactly one preparation step and/or contains indications/details about a preparation step. In particular, in a recipe, one or more details, indications, items of information, values, characteristics and/or parameters relating to food to be used, one or more kitchen appliances to be used and/or one or more actions to be performed and/or one or more preparation parameters are assigned to each preparation step—preferably in tabular form.

The control device of the kitchen system, in particular of the kitchen machine, is designed to execute the recipe and/or the preparation of a food and/or individual, multiple or all preparation steps at least partially automatically on the basis of the recipe, in particular of the preparation parameter(s) mentioned in the recipe, in particular by controlling an electric motor and/or stirrer and/or a heating system of the kitchen system, in particular of the kitchen machine.

The food database preferably comprises one or more details, indications, items of information, values, characteristics and/or parameters for one or more foods, hereinafter referred to as food parameters. In particular, one or more food parameters are assigned to one or more foods or food identifiers—preferably in tabular form—in the food database.

A food parameter in the sense of the present technology may be a physical value, a physiological value, a (bulk) density, a hardness, an elasticity, a melting temperature, a boiling temperature, a specific heat capacity, a specific enthalpy of vaporization, a thermal conductivity, a solubility, a nutritional value, a starch content, sugar content, nutrient content and/or water content, a degree of swelling, a chopping capability, a divisibility or any other characteristic of the associated food.

The appliance database preferably comprises one or more details, indications, items of information, values, characteristics and/or parameters for one or more kitchen appliances of the kitchen system, hereinafter referred to as appliance parameters. In particular, one or more appliance parameters are assigned to one or more kitchen appliances and/or appliance identifiers—preferably in tabular form—in the appliance database.

An appliance parameter can be a technical function/capability, such as a heating function, a cooling function, a chopping function and/or a stirring or mixing function, and/or a technical property, a (food-specific) power, a (food-specific) temperature, a temperature range, a maximum temperature, a (food-specific) rotational speed, a rotational speed range, a maximum rotational speed, a torque, a (holding) capacity, a (food-specific) maximum quantity, a sieve size or the like of the associated kitchen appliance.

The proposed method is preferably carried out by means of the proposed kitchen system, in particular the kitchen machine of the kitchen system.

In the method, it is provided to use and/or access a (digital) database system, wherein the database system comprises a (digital) recipe database with a plurality of (digital) recipes for processing and/or preparing food, wherein the recipes of the recipe database each contain at least one (preset) quantity specification and/or a specification of the quantity/amount of the food to be used for the preparation and/or in accordance with the recipe and at least one preparation parameter for one or more preparation steps, such as a heating time, a chopping time and/or a mixing time.

The amount/quantity specified/preset in the recipe and/or to be used for the preparation is always referred to as the recipe quantity in the following.

A quantity or amount in the sense of the present technology is preferably the mass in particular in [kg], the volume in particular in [m$^3$] or [l], the length in particular in [cm] and/or the number of items of a food. Preferably, the (recipe) quantity of a food is specified or indicated—in particular in the recipe and/or via the user interface—as a kitchen measure, in particular a weight measure, a capacity measure, a counting measure, a length measure and/or by a cutlery indication, such as an indication regarding a tablespoon, a teaspoon and/or a knife tip with the food.

Based on a user input and/or via the user interface of the kitchen system, in particular of the kitchen machine, a recipe is selected from the recipe database. In particular immediately afterwards, the recipe quantity of the food is scaled—preferably automatically/self-actingly and/or continuously/stepless—on the basis of the or a further user input and/or via the user interface, in particular by means of the data processing device and/or in order to obtain an adjusted/scaled quantity of the food. For example, a user can specify via the user interface a number of servings and/or persons for which the selected recipe is to be performed. The data processing device can scale the recipe quantity and/or determine the scaled quantity based on the number of servings and/or persons.

The term "scaling" in the sense of the present technology is preferably understood to mean an—in particular automatic, stepless and/or quantitative—adjustment of the recipe quantity of the food(s), in particular on the basis of a user input made and/or in order to change the quantity of the food, meal or dish to be prepared and/or in order to determine a scaled/adjusted quantity.

According to a first method variant of the proposed method, the database system comprises—in addition to the recipe database—a (digital) food database with at least one food parameter for the food, such as a specific heat capacity, a specific enthalpy of vaporization and/or a vaporization rate, a chopping factor for determining, setting or adjusting the chopping time and/or a mixing factor for determining, setting or adjusting a mixing time.

Depending on the scaled quantity of the food and using the food database and/or the food parameter, the preparation parameter is determined, set or adjusted automatically, in particular without additional input by a user and/or (exclusively) by means of the data processing device. For example, by means of the specific heat capacity of the food the (required) heating time to a (target) temperature, by means of the specific enthalpy of vaporization the vaporization rate, by means of the chopping factor the (required) chopping time and/or by means of the mixing factor the (required) mixing time of the scaled quantity can be set/determined/adjusted.

In this way, a constant/consistent quality of the preparation result is ensured even with a scaled recipe and/or a scaled quantity. In particular, the flexibility of the kitchen system is increased and/or individual preparation steps are (fully) automatically adapted to a change in quantity, preferably without having to manually set or adjust individual preparation parameters.

According to a second, also independently implementable method variant, which can also be carried out in combination with the first method variant, the database system comprises—in particular in addition to the recipe database and/or food database—a (digital) appliance database with at least one (appliance-specific) appliance parameter for a plurality of kitchen appliances.

The appliance parameter can be a technical and/or food-specific function/capability of the kitchen appliance, for example a heating function, a cooling function, a mixing or stirring function and/or a chopping function, and/or a technical and/or food-specific property, a (food-specific) power, a (food-specific) temperature, a (food-specific) temperature range, a (holding) capacity and/or a (food-specific) maximum quantity/amount of the kitchen appliance.

Depending on the scaling and/or scaled quantity of the food and using the appliance database and/or the appliance parameter, in particular the capacity and/or the (food-specific) maximum quantity as appliance parameter, a kitchen appliance to be used for the preparation or a preparation step is determined and/or selected automatically—in particular without additional inputs by a user and/or (exclusively) by means of the data processing device—in particular by (systematically) comparing the capacity and/or the maximum quantity of the kitchen appliances with the scaled quantity of the food.

In particular, a kitchen appliance is automatically selected from the appliance database that has the appliance parameter required for the preparation step, such as a sufficiently large capacity and/or a sufficiently large maximum quantity for the scaled quantity.

Especially preferably, the smallest possible kitchen appliance is automatically selected, and/or the kitchen appliance with the smallest capacity that is still sufficient for preparing the scaled quantity is selected.

Optionally, when determining and/or selecting the kitchen appliance to be used—in addition to the appliance database and/or the appliance parameter—the food database and/or a food parameter of the food database, in particular the (bulk) density, a starch content and/or sugar content and/or a degree of swelling, is used, in particular to determine the food-specific maximum quantity of the kitchen appliance together with the capacity as appliance parameter.

In this way, the flexibility of the kitchen system is increased and/or the number and/or usage of the kitchen appliances used is adapted/adjusted and/or optimized, in particular (fully) automatically, to a change in quantity.

Furthermore, by means of the proposed method, it is possible to circumvent and/or resolve system-related size limitations by outsourcing and/or distributing one or more preparation steps to other and/or further kitchen appliances and/or to prepare larger quantities of the food, in particular without having to carry out individual or multiple preparation steps more than once. In this way, preparation times and the use of resources, in particular energy consumption, can be reduced or minimized.

Preferably, a kitchen appliance is preset in the recipe and/or the recipe contains an indication of the kitchen appliance to be used for a preparation step. In the following, the kitchen appliance specified/preset in the recipe and/or to be used for a preparation step is always referred to as the recipe-specified kitchen appliance.

Depending on the scaled and/or adjusted amount/quantity of food and using the appliance parameter, in particular the capacity, it is automatically checked—in particular without additional input by a user and/or (exclusively) by means of the data processing device—whether an alternative or additional kitchen appliance of the kitchen system is to be used in addition to the recipe-specified kitchen appliance, in particular in order to reduce the preparation time and/or the energy consumption of the preparation.

In the case of a quantity reduction, it is preferably checked whether a smaller kitchen appliance than the recipe-specified kitchen appliance is available and/or usable and/or to be used, in particular by a (systematic) comparison of the scaled quantity with the capacity and/or the maximum quantity of the kitchen appliances.

Preferably, in case of an increase in quantity, it is checked whether the recipe-specified kitchen appliance can still be used or whether a larger kitchen appliance than the recipe-specified kitchen appliance or an additional kitchen appliance to the recipe-specified kitchen appliance is available and/or usable and/or to be used, in particular by a (systematic) comparison of the scaled quantity with the capacity of the kitchen appliances.

The determination, setting and/or adjustment is preferably made for each preparation step in which a kitchen appliance is used.

Following the automatic determination, setting and/or adjustment of the preparation parameter and/or the kitchen appliance, in particular for all preparation steps of the selected recipe, the preparation and/or the recipe is preferably executed at least partially automatically by means of the kitchen system, in particular the control device of the kitchen system, in particular taking into account the determined, set or adjusted preparation parameter.

A further aspect of the present technology, which can also be implemented independently, relates to a computer program product comprising instructions which, when the program of the computer program product is executed by a data processing device of the kitchen system, in particular of the kitchen machine, cause the data processing device to perform the proposed method and/or one or more method steps of the proposed method. In particular, the data processing device comprises a computing unit for executing the program of the computer program product and/or a memory on which the program of the computer program product is stored (electronically). In this way, corresponding advantages are realized.

The above-mentioned aspects, features, method steps and method variants of the present technology as well as the aspects, features, method steps and method variants of the present technology resulting from the claims and the following description can in principle be realized independently of each other, but also in any combination and/or sequence.

Further aspects, advantages, features and properties/characteristics of the present technology result from the claims and the following description of a preferred embodiment with reference to accompanying drawings.

DETAILED DESCRIPTION

In the figures, some of which are not to scale and are only schematic, the same reference signs are used for the same, identical or similar parts and components, wherein corresponding or comparable properties and advantages are achieved, even if no repeated description is given.

Figure 1:
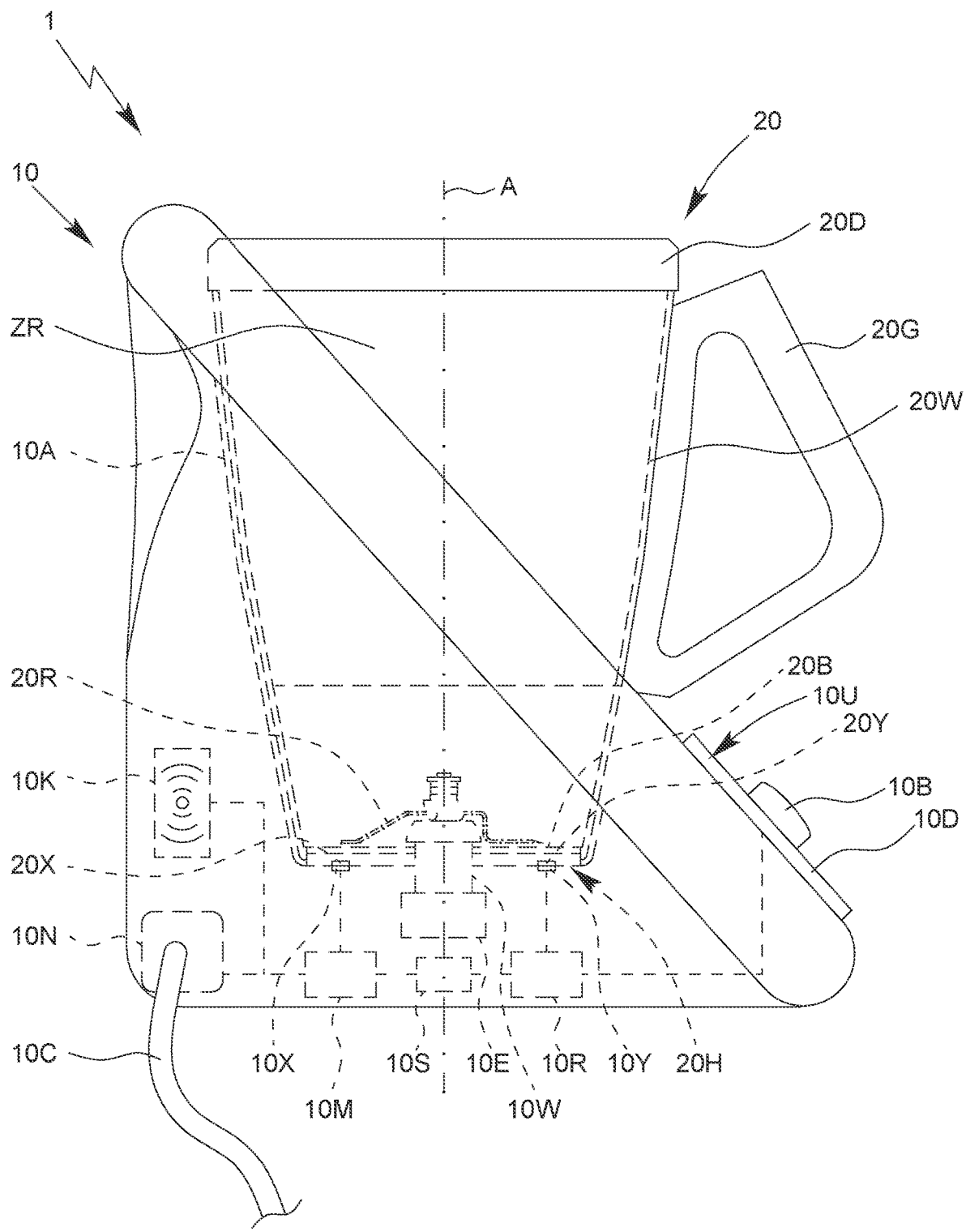
FIG. 1 is a schematic side view of a proposed kitchen machine.

FIG. 1 schematically shows a proposed cooking apparatus/food processor/kitchen machine 1 for the preparation of food and/or for the processing of food/ingredients, in particular for the preparation of meals/dishes and/or components thereof. The kitchen machine 1 is preferably an electrically operated multi-functional kitchen machine/food processor designed for chopping, stirring/mixing and/or heating/cooking food.

The kitchen machine 1 preferably has a base station 10 and/or a vessel/container 20 to receive/hold food (food not shown).

The base station 10 and the vessel 20 are preferably electrically and/or mechanically connected or connectable to each other, in particular to allow heating and/or mixing/stirring of the food in the vessel 20. In addition, solutions are also possible in which the base station 10 and the vessel 20 are additionally fluidically connected or connectable to each other, for example in order to conduct water vapor generated in the base station 10 into the vessel 20.

FIG. 1 shows the kitchen machine 1 in its usual state of use and/or in the connection position in which the vessel 20 is electrically and/or mechanically connected to the base station 10.

The base station 10 preferably has a receptacle 10A to receive/accommodate the vessel 20 at least partially and/or at the bottom. Particularly preferably, the vessel 20 is at least partially insertable or suspendable in the base station 10 in order to connect the vessel 20 mechanically and/or electrically to the base station 10.

The vessel 20 has a wall 20W, a bottom 20B and a preparation chamber ZR, the wall 20W delimiting the preparation chamber ZR radially/laterally and the bottom 20B delimiting the preparation chamber ZR axially/from below.

The vessel 20 preferably has a lid 20D in order to delimit the preparation chamber ZR axially/from above and/or to close it in particular pressure-safe.

Optionally, the vessel 20 is equipped with a handle 20G to simplify the handling of the vessel 20.

In the embodiment shown, the vessel 20 is at least essentially round and/or cylindrical in shape. However, in principle, embodiments are also possible in which the vessel 20 is angular, in particular rectangular.

The vessel 20 has a central axis A, the central axis A passing centrally through the vessel 20 and/or preparation chamber ZR, as indicated in FIG. 1.

Preferably, the central axis A is a longitudinal or symmetry axis of the preferably elongated, cylindrical and/or at least substantially rotationally symmetrical vessel 20.

Optionally, the vessel 20 is equipped with a stirrer 20R, in particular for comminuting/chopping and/or (thoroughly) mixing/stirring food in the preparation chamber ZR. The stirrer 20R is preferably rotatably mounted and/or located at the bottom 20B of the vessel 20. The stirrer 20R preferably has a plurality of, in particular exchangeable, stirring paddles/blades.

Preferably, the stirring blades have cutting edges or are designed as cutting blades to chop up food.

Preferably, the central axis A of the vessel 20 corresponds to the axis of rotation of the stirrer 20R.

Preferably, the vessel 20 is mechanically connected or connectable to the base station 10 to drive the stirrer 20R by means of the base station 10.

To drive the stirrer 20R, the kitchen machine 1, in particular the base station 10, has an electric motor 10E, which is connected or connectable to the stirrer 20R via a shaft 10W and/or—in the connection position of the vessel 20—engages positively/form-fittingly in the bottom 20B from below.

As already explained at the beginning, the kitchen machine 1 is designed to heat food and/or a medium in the vessel 20 and/or in the preparation chamber ZR.

For this purpose, the vessel 20 and/or preparation chamber ZR is electrically heatable and/or the kitchen machine 1 has an electric heating system 20H.

The heating system 20H is designed for (direct) heating of the vessel 20, in particular the bottom 20B and/or the preparation chamber ZR. Particularly preferably, the heating system 20H is designed as a thick-film heater.

In the embodiment shown, the heating system 20H is integrated into the vessel 20, in particular the bottom 20B, and/or the heating system 20H or a part of the heating system 20H forms the bottom 20B of the vessel 20 or part thereof. However, constructive solutions are also possible in which the base station 10 has or forms the heating system 20H.

In order to enable a power supply to the base station 10 and/or the vessel 20, in particular the heating system 20H and/or the electric motor 10E, the kitchen machine 1, in particular the base station 10, is equipped with a power supply unit 10N—preferably with appropriate charging electronics—and/or a power cord 10C for connection to a mains supply.

Preferably, the base station 10 has one or more electrical connections 10X and/or 10Y for the vessel 20, in order to connect the vessel 20—in the connection position—electrically with the base station 10 and/or the power supply unit 10N and/or to supply it with electrical energy/power.

The electrical connection(s) 10X and/or 10Y are/is preferably integrated into the receptacle 10A of the base station 10, in particular in such a way that by inserting the vessel 20 into the base station 10, an electrical connection is automatically established between the vessel 20 and the base station 10.

The vessel 20 preferably has one or more electrical connections 20X and/or 20Y corresponding to the electrical connection 10X and/or 10Y, preferably wherein the electrical connection 20X and/or 20Y are/is located on an underside of the vessel 20 and/or the bottom 20B, as indicated in FIG. 1.

The electrical connections 10X/10Y and 20X/20Y are preferably formed by one or more electrical contacts or—in particular for wireless power transmission—by one or more coils.

The kitchen machine 1, in particular the base station 10, preferably has a user interface 10U, a data processing device 10R, a control device 10S, a communication device 10K and/or a measuring device 10M, preferably wherein the user interface 10U, the data processing device 10R, the control device 10S, the communication device 10K, the measuring device 10M, the power supply unit 10N, the heating system 20H, the electric motor 10E and/or the connections 10X, 10Y are electrically connected to each other, as indicated by dashed lines in FIG. 1.

The user interface 10U is formed by at least one display device 10D, such as a screen, and/or at least one input device 10B, in particular a control element, such as a rotary knob. Via the user interface 10U, a user of the kitchen machine 1 can interact with the kitchen machine 1 and/or take from and/or add to the kitchen machine 1 one or more parameters and/or items of information, for example concerning the operation of the kitchen machine 1, the food to be prepared and/or the recipe to be used.

The data processing device 10R is preferably a device for evaluating, storing and/or processing one or more signals, data, measured values, reference values, information, parameters or the like. In particular, the data processing device 10R has a computing unit, such as a processor, and/or a (data) storage/memory, for example in the form of an SSD.

The control device 10S is preferably designed to control, in particular to activate or deactivate, the electric motor 10E and/or the stirrer 20R and/or the heating system 20H, in particular according to the specifications of a recipe, and/or to adjust the power of the electric motor 10E and/or the heating system 20H, preferably at least partially automatically.

By means of the communication device 10K, the kitchen machine 1 can be coupled (in terms of data connection) with one or more (external) devices, in particular a mobile device 5, such as a mobile phone/cell phone, and/or apparatuses, in particular a central apparatus, such as a server.

In particular, the communication device 10K enables a wired or wireless data connection between the kitchen machine 1 and one or more (external) devices and/or one or more apparatuses in order to determine a signal and/or information, in particular concerning the operation of the kitchen machine 1, the food to be prepared and/or the recipe to be used, and/or to exchange it between the kitchen machine 1 and the device(s) and/or the apparatus(es), wherein the data exchange and/or the signal transmission can take place directly or indirectly.

A signal in the sense of the present technology is preferably a means of transmitting information, a (modulated) wave, a bit sequence, a packet in the information technological sense or the like. In particular, one or more pieces of information are assigned to a signal and/or contained in the signal, which is or are transmittable by means of the signal.

The communication device 10K preferably comprises a receiver for receiving a signal, a transmitter for transmitting a signal, and/or an interface, in particular a radio interface, a WPAN interface, a near field communication interface, an NFC interface, a WLAN interface, or another, particularly preferred wireless, interface.

By means of the measuring device 10M, one or more measured variables, such as a temperature, a weight, an electrical voltage, an electrical current, an electrical resistance, a rotational speed, a pressure, an air humidity and/or an inclination of the kitchen machine 1, in particular of the base station 10 and/or of the vessel 20, particularly preferably of the electric motor 10E and/or the heating system 20H, can be determined/measured (directly or indirectly). For this purpose, the measuring device 10M has one or more sensors and/or measuring units, such as a temperature sensor, a scale, a voltage measuring unit/voltmeter, a current measuring unit/ammeter, a rotational speed measuring unit/revolution counter, a pressure sensor, a humidity sensor and/or an inclination sensor.

Figure 2:
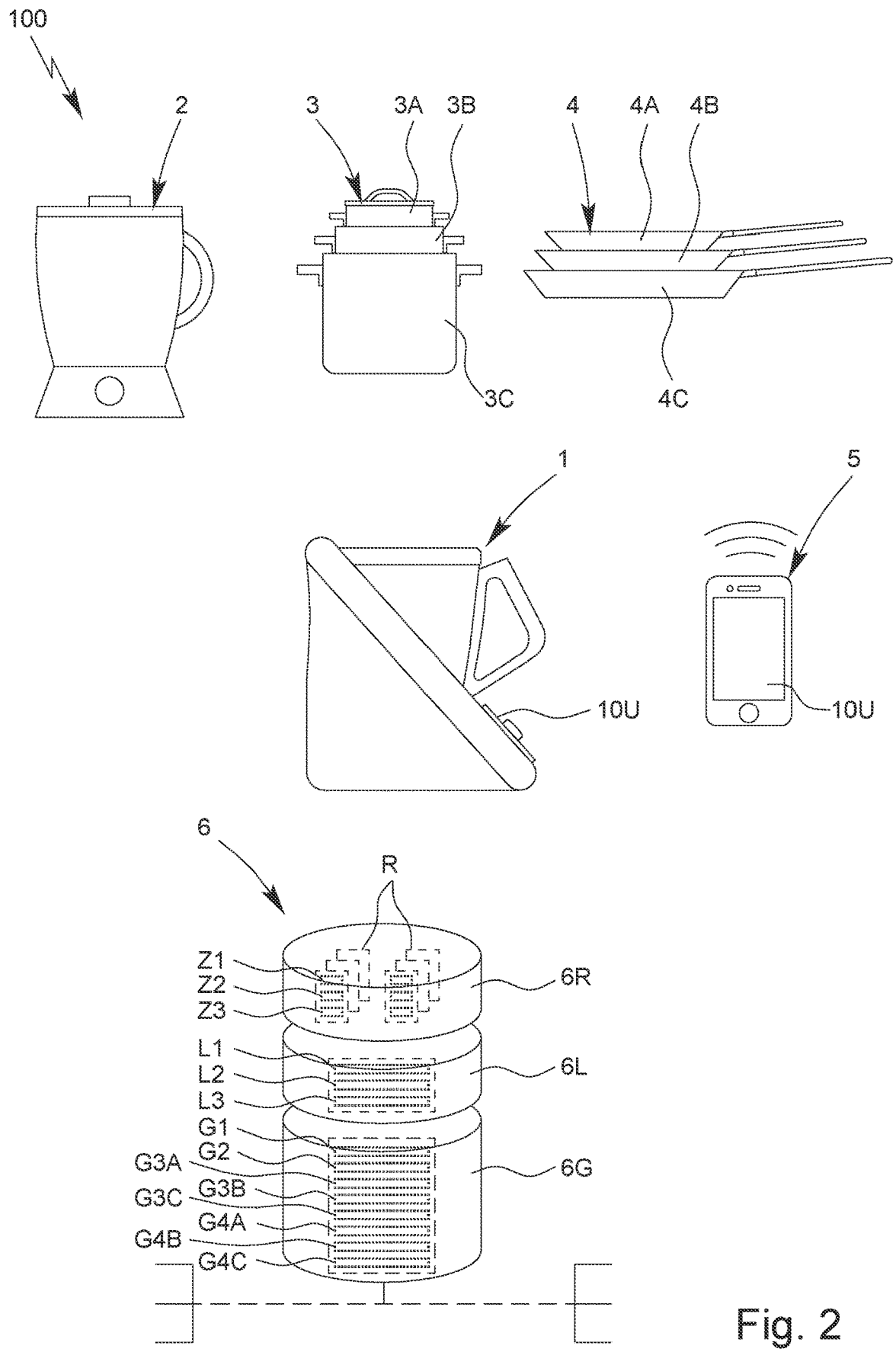
FIG. 2 is a schematic view of a proposed kitchen system with the kitchen machine according to FIG. 1, further kitchen appliances and a database system.

FIG. 2 schematically shows a proposed kitchen system 100 for at least partially automatic preparation and/or processing of a food product, in particular for preparation of meals/dishes and/or components thereof.

The kitchen system 100 is preferably multi-part and/or formed by a plurality of (individual) components.

The kitchen system 100 comprises at least one kitchen equipment/kitchen utensil/kitchen appliance, in particular the kitchen machine 1. However, it is preferred that the kitchen system 100 comprises a plurality of kitchen appliances, in particular to prepare a food product by means of a selection of kitchen appliances.

In the embodiment shown in FIG. 2, the kitchen system 100 comprises, in addition to the kitchen machine 1, a mixer/blender 2, a plurality of pots 3A to 3C, and a plurality of pans 4A to 4C.

Preferably, the kitchen appliances of the kitchen system 100 are designed differently and/or some or all of the kitchen appliances of the kitchen system 100 differ with respect to their functional, technical and/or food-specific capabilities, functions and/or properties, in particular with respect to power, temperature or temperature range, (food-specific) holding capacity and/or (food-specific) maximum quantity.

In the embodiment shown, the kitchen appliances, in particular the pots 3A to 3C and the pans 4A to 4C, are differently dimensioned/sized, and/or the kitchen appliances, in particular the pots 3A to 3C and the pans 4A to 4C, have different (holding) capacities.

As explained at the outset, the proposed kitchen system 100 preferably comprises a user interface, a data processing device and/or a control device.

It is preferred that the user interface 10U, the data processing device 10R and/or the control device 10S of the kitchen machine 1 is/are used as user interface, data processing device and/or control device of the kitchen system 100. However, solutions are also possible in which another kitchen appliance comprises or forms the user interface, the data processing device and/or the control device of the kitchen system 100.

For example, the kitchen system 100 may comprise or be coupled (in terms of data connections) to a mobile device 5, such as a mobile phone/cell phone, preferably wherein the mobile device 5 comprises or forms the or an additional user interface, the or an additional data processing device and/or the or an additional control device of the kitchen system 100.

The kitchen system 100, in particular the data processing device 10R, is preferably connected or connectable to a database system 6 (in terms of data connections). Additionally or alternatively, the kitchen system 100, preferably the kitchen machine 1 and/or the mobile device 5, may comprise the or an additional database system 6.

The database system 6 preferably comprises a (digital) recipe database 6R, a (digital) food database 6L and/or a (digital) appliance database 6G. The database system 6 may also comprise other databases, such as a (digital) measurement unit database comprising a plurality of measurement units (and/or measurement unit types) and associated conversion factors.

As already explained at the beginning, the recipe database 6R, the food database 6L and/or the appliance database 6G are/is preferably (respectively) designed as a relational and/or table-based database and/or integrated in the (common) database system 6.

The database system 6, in particular the recipe database 6R, preferably comprises one or more (digital) recipes or recipe programs R, in particular wherein the recipes R comprise a programmatic instruction for preparing/processing food by means of the kitchen system 100 and/or the kitchen machine 1.

The recipes R preferably each have at least one or more preparation steps Z, wherein the preparation steps Z are to be carried out one after the other and/or according to a preset sequence and/or each form a data set of the recipes R.

Preferably, the database system 6, in particular the recipe database 6R, particularly preferably each recipe R of the recipe database 6R, has (exactly) one data set for each preparation step Z.

Preferably, each recipe R or each preparation step Z of a recipe R comprises one or more specifications, items of information, values, characteristics and/or parameters concerning a food to be used and/or a food according to the recipe and/or one or more specifications, items of information, values, characteristics and/or parameters concerning a kitchen appliance to be used and/or a kitchen appliance according to the recipe and/or an action or instruction to be performed.

The specifications, items of information, values, characteristics and/or parameters concerning the kitchen appliance according to the recipe and/or an action or instruction to be carried out are hereinafter referred to as preparation parameters.

A preparation parameter of a recipe R and/or of a preparation step Z can be, for example, a (preparation) time t, a (preparation) temperature T, a (preparation) pressure, a (preparation) rotational speed and/or a (preparation) power P.

For example, in a first preparation step Z1 of a recipe R, a specified or recipe-defined amount/quantity M1 of a food item can, for a predetermined heating time to as a (first) preparation parameter, be subjected to a predetermined temperature T or (heating) power P as a (second) preparation parameter in a recipe-specified kitchen appliance.

The food database 6L preferably comprises one or more specifications, items of information, values, characteristics and/or parameters for one or more food items, hereinafter referred to as food parameters. In particular, one or more food parameters are assigned to one or more food items and/or to a food identifier L—preferably in table form—in the food database 6L.

A food identifier L is an identifier assigned to a food (item) and is provided to uniquely identify the food (item). FIG. 2 shows three food identifiers L1 to L3, the first food identifier L1 being assigned to a first food, the second food identifier L2 to a second food, and the third food identifier L3 to a third food.

Preferably, the database system 6, in particular the food database 6L, has for one or more food items (exactly) one data set with at least one food parameter.

For example, a food parameter may be a density, a specific heat capacity c, a specific enthalpy of vaporization h, a chopping factor fz, a mixing factor fm, a hardness, an elasticity, a melting temperature, a boiling temperature, a nutritional value, a thermal conductivity, a solubility, and/or a divisibility of a food.

The database system 6, in particular the appliance database 6G, preferably comprises one or more specifications, items of information, values, characteristics and/or parameters for the kitchen appliance(s) of the kitchen system 100, hereinafter referred to as appliance parameters.

In particular, in the database system 6 or the appliance database 6G, one or more appliance parameters are assigned to one or more kitchen appliances and/or to one or more appliance identifiers G—preferably in table form.

An appliance identifier G is an identifier assigned to a kitchen appliance and serves to uniquely identify the kitchen appliance. Particularly preferably, each kitchen appliance of the kitchen system 100 is assigned exactly one appliance identifier G.

In FIG. 2, eight appliance identifiers G1 to G4C are shown, wherein the first appliance identifier G1 is assigned to the kitchen machine 1, the second appliance identifier G2 is assigned to the blender 2, the third to fifth appliance identifiers G3A to G3C are assigned to the pots 3A to 3C, and the sixth to eighth appliance identifiers G4A to G4C are assigned to the pans 4A to 4C.

Preferably, the database system 6, in particular the appliance database 6G, has (exactly) one data set with at least one appliance parameter for each kitchen appliance of the kitchen system 100.

An appliance parameter can, for example, be a technical and/or food-specific function, such as a heating function, a cooling function, a chopping function and/or a stirring/mixing function, and/or a technical and/or food-specific property, such as a power P, a (food-specific) holding capacity V, a (food-specific) temperature, a temperature range, a (food-specific) maximum temperature, a (food-specific) rotational speed, a rotational speed range, a (food-specific) maximum rotational speed, a torque, a (food-specific) maximum quantity, a sieve size or the like.

As already explained, the kitchen system 100, in particular the kitchen machine 1 and/or the mobile device 5, particularly preferably the data processing device 10R, is or are (in terms of data connections) coupled or couplable with the database system 6, in particular the recipe database 6R, the food database 6L and/or the appliance database 6G, preferably by means of the communication device 10K and/or in such a way that the data or data sets, in particular the preparation parameters, the food parameters and/or the appliance parameters, can be retrieved, processed, stored and/or modified, particularly preferably by means of the data processing device 10R.

In the following, with reference to FIGS. 3 to 6, the proposed method of operating the kitchen system 100 and/or the kitchen machine 1 is described in more detail.

The method is preferably multi-stage or multi-step. In particular, the method has a plurality of method steps.

Figure 3:
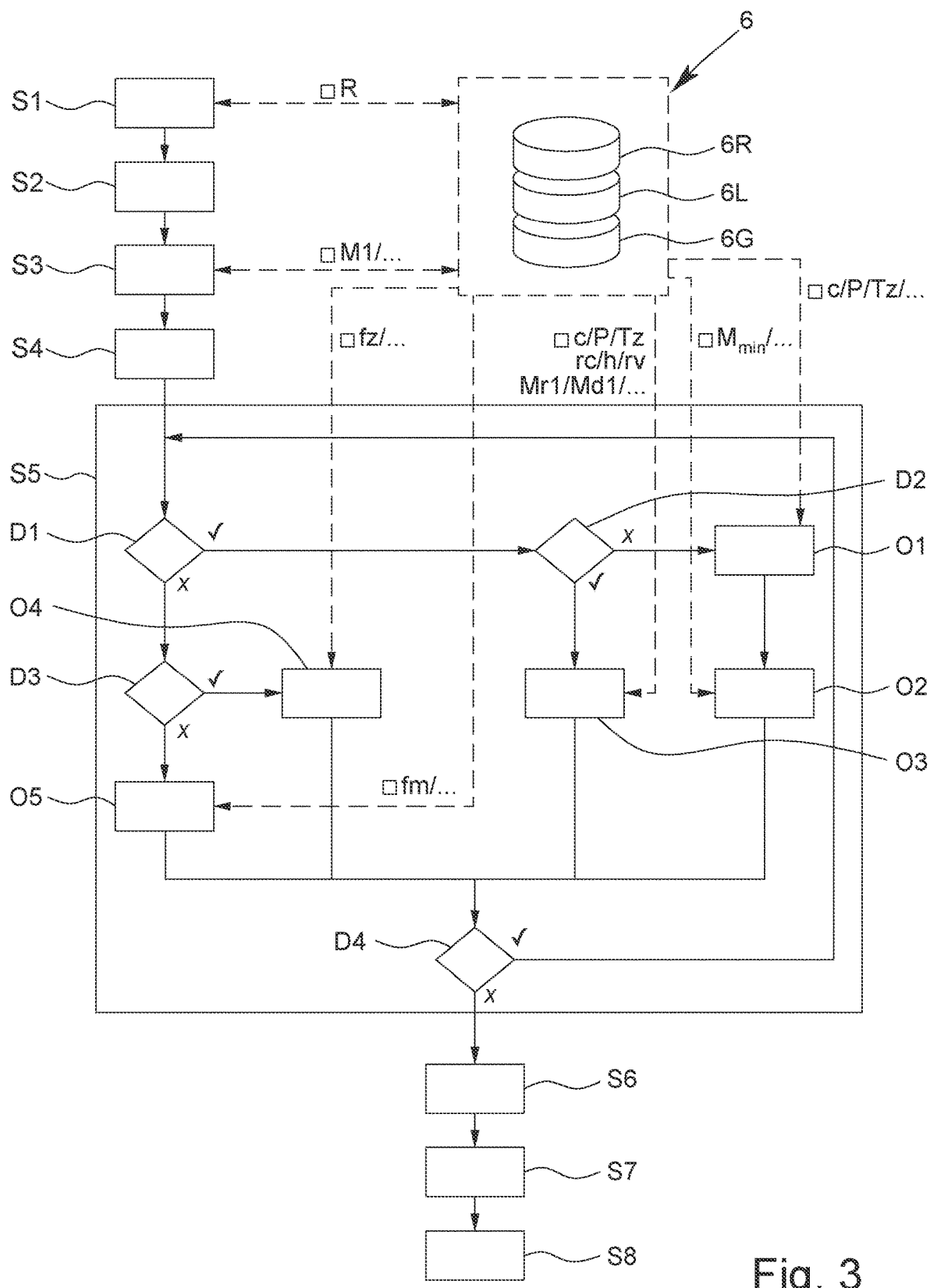
FIG. 3 is a schematic flow chart of a proposed method for operating the kitchen system.

FIG. 3 shows a schematic flow diagram/flow chart of the proposed method with a plurality of, here eight, method steps S1 to S8, wherein the individual method steps S1 to S8 can in principle be implemented independently of one another.

The proposed method is preferably carried out by or in the kitchen system 100, in particular by means of the kitchen machine 1, the control device 10S, the data processing device 10R, the user interface 10U, the communication device 10K and/or the database system 6.

As already explained at the outset, with the proposed method, also modified and/or scaled quantities M2 of food, in comparison with the recipe-defined quantities M1, shall be prepared at least partially automatically by means of the kitchen system 100, in particular by (automatically) determining, setting or adjusting one or more preparation parameters and/or the kitchen appliance(s) to be used, particularly preferably fully automatically and/or (exclusively) by means of the data processing device 10R and/or without a user having to manually set or adjust the preparation parameter(s) and/or manually select the kitchen appliance(s).

The method is preferably initiated by an input from a user via the user interface 10U, in particular the input device 10B.

Preferably, in a first method step S1, a recipe R is selected from the database system 6/the recipe database 6R, in particular via the user interface 10U or the input device 10B and/or by accessing the recipe database 6R.

Consequently, in a first method step S1, a user can access the database system 6, in particular the recipe database 6R, via the user interface 10U, in particular the input device 10B and/or display device 10D, to select a preferred recipe R, as illustrated by a dashed line in FIG. 3.

In a further or second method step S2, a scaling factor fs is determined and/or the selected recipe R is scaled in terms of amount/quantity (of food), in particular by means of the or a further user input. However, it is also possible that no user input is necessary here. For example, the scaling factor fs or a number of servings or persons may be stored or preset in the data processing device 10R.

The scaling factor fs is preferably a factor by which the amount/quantity M1 of a food item specified/defined in the recipe R or according to the recipe R—in the following referred to as recipe quantity M1—is multiplied in order to enable scaling of the recipe R or the recipe quantity M1 and/or in order to determine a scaled amount/quantity M2, particularly preferably according to the following equation:

$$M2=fsM1.$$

Preferably, a user can input the number of desired servings, the amount of a food item available, and/or a physical condition via the user interface 10U, in particular the input device 10B, to determine the scaling factor fs.

For example, the scaling factor fs is 0.5 if a user wants only two servings instead of the four servings specified or preset in the recipe R, only half the amount of a food required for the selected recipe R is available, or the user is less hungry than average.

In a further or third method step S3, the recipe R and/or the recipe sequence of the recipe R is analyzed with regard to the required food (items). In particular, the quantities M1 of food specified in the preparation steps Z of the recipe R or according to the recipe R are retrieved from the database system 6, in particular the recipe database 6R, as illustrated in FIG. 3 by a dashed line, and optionally stored in the data processing device 10R.

In a further or fourth method step S4, the recipe quantities M1 are scaled or multiplied by the scaling factor fs—in particular in or by means of the data processing device 10R— in order to determine/calculate the scaled quantities M2.

Preferably, all quantities M1 specified in the recipe R and/or in the preparation steps Z and/or all recipe quantities M1 are scaled. However, it is possible that one or more recipe quantities M1 are excluded from scaling and/or that not all recipe quantities M1 of a food are scaled and/or that the scaling for one or more recipe quantities M1 is withdrawn in a later method step, as will be explained in more detail below.

In a further or fifth method step S5, the preparation is (automatically) optimized or adapted to the scaling or to the scaled quantities M2. Preferably, one or more preparation parameters are (automatically) set or adapted, in particular (exclusively) by means of the data processing device 10R, as a function of the scaled quantity M2, in particular using the food database 6L and/or one or more food parameters.

By determining, setting or adjusting the preparation parameters, it is made possible that the quality of the prepared food, the prepared dish and/or the prepared meal remains the same despite changed or scaled quantities M2.

It has been found that—preferably exclusively—the (preparation) time t, in particular the heating time ta, the chopping time tz and/or the mixing time tm, of one or more food items must be adapted to the scaling of the recipe R and/or to the scaled quantities M2, in particular in order to achieve a consistent result.

The power P, in particular the stirring level, chopping level and/or heating level, and/or the (target) temperature of the kitchen system 100 and/or of the kitchen machine 1, on the other hand, are not to be adapted. However, method variants are possible in which, in addition or alternatively to the times t, (also) the power P and/or the temperature T of the kitchen system 100 and/or of the kitchen machine 1 are adapted to the scaling of the recipe R and/or to the scaled quantities M2.

To determine, set or adjust the preparation parameters, the preparation steps Z are run through one after the other, preferably with the preparation parameter(s) of the first preparation step Z being determined/set/adjusted first and the preparation parameter(s) of the last preparation step Z being determined/set/adjusted last.

Preferably, the preparation step(s) Z are classified as "heating", "cooking/boiling", "steaming", "chopping" and/or "mixing and stirring".

In heating, a food is heated by means of the kitchen system 100, in particular the kitchen machine 1, particularly preferably by means of the heating system 20H, preferably to a (target or preparation) temperature Tz, preferably for a heating time ta, and/or is cooked, preferably boiled and/or steamed, at a (target or preparation) temperature Tz.

In particular, heating may be cooking, boiling and/or steaming the food.

In cooking or boiling, a food is cooked in a liquid, in particular water, preferably at the temperature Tz and/or the boiling temperature of the liquid and/or at at least substantially 100° C.

In steaming, a food is cooked without or by means of a liquid, in particular water. Preferably, steaming may comprise cooking a food in steam of a medium and/or without contact to a steam-generating medium, for example water (steaming or steam cooking).

During chopping, a food is chopped, comminuted or pureed by means of the kitchen system 100, in particular the kitchen machine 1, particularly preferably the stirrer 20R, preferably for a chopping time tz.

In mixing and stirring, both referred to hereinafter as mixing, a food is stirred and/or mixed/blended by means of the kitchen system 100, in particular the kitchen machine 1, particularly preferably the stirrer 20R, preferably for a mixing time tm.

In the case of heating, in particular cooking, boiling and/or steaming, the preparation parameter to be set or adjusted is the heating time ta and/or the heating time ta is set or adjusted to the scaling of the recipe R and/or to the scaled quantities M2.

In the case of chopping, the preparation parameter to be set or adjusted is the chopping time tz and/or the chopping time tz is set or adjusted to the scaling of the recipe R and/or to the scaled quantities M2.

In the case of mixing, the preparation parameter to be set or adjusted is a mixing time tm and/or the mixing time tm is set or adjusted to the scaling of the recipe R and/or to the scaled quantities M2.

In order to set or adjust the preparation parameter, in particular the heating time ta, the chopping time tz and/or the mixing time tm, the required data, specifications, items of information, values, characteristics and/or parameters are retrieved from the database system 6, in particular the recipe database 6R, the food database 6L and/or the appliance database 6G, and/or are stored and/or processed—at least temporarily—in the data processing device 10R.

Preferably, it is checked—initially and/or by means of a first branching/decision D1—whether heating is taking place in the preparation step Z, in particular by comparing the (target or preparation) temperature Tz of the preparation step Z with a predefined threshold temperature. For example, heating takes place if the (target or preparation) temperature Tz of the preparation step Z is greater than or equal to 50° C.

If heating is present and/or the (target or preparation) temperature Tz of the preparation step Z is greater than the threshold temperature, it is preferably checked subsequently and/or by means of a second branching/decision D2 whether steaming or boiling is taking place, for example by means of the amount of heated water and/or by checking whether a steaming utensil is to be used according to the recipe.

In the case of boiling, the heating time ta is preferably determined, set or adjusted in a (computing) operation O1 and/or in the case of steaming in a (computing) operation O3.

Preferably, the heating time ta is the time for which a food is heated in the preparation step Z of the recipe R. In particular, the heating time ta is the time required to reach the target temperature Tz of the food and/or the time for the food to have or be exposed to the target temperature Tz.

The target temperature Tz is preferably the temperature at which cooking processes of the heated food start. In particular, the target temperature Tz is food-specific.

Preferably, the heating time ta increases with an increase of the recipe quantity M1 and/or with a scaling factor fs greater than 1, and the heating time ta decreases with a decrease of the recipe quantity M1 and/or with a scaling factor fs less than 1.

Consequently, the (scaled) heating time ta2 of an increased quantity M2 is greater and the (scaled) heating time ta2 of a decreased/reduced quantity M2 is smaller than the (recipe-specified) heating time ta1 of the recipe quantity M1.

Figure 4:
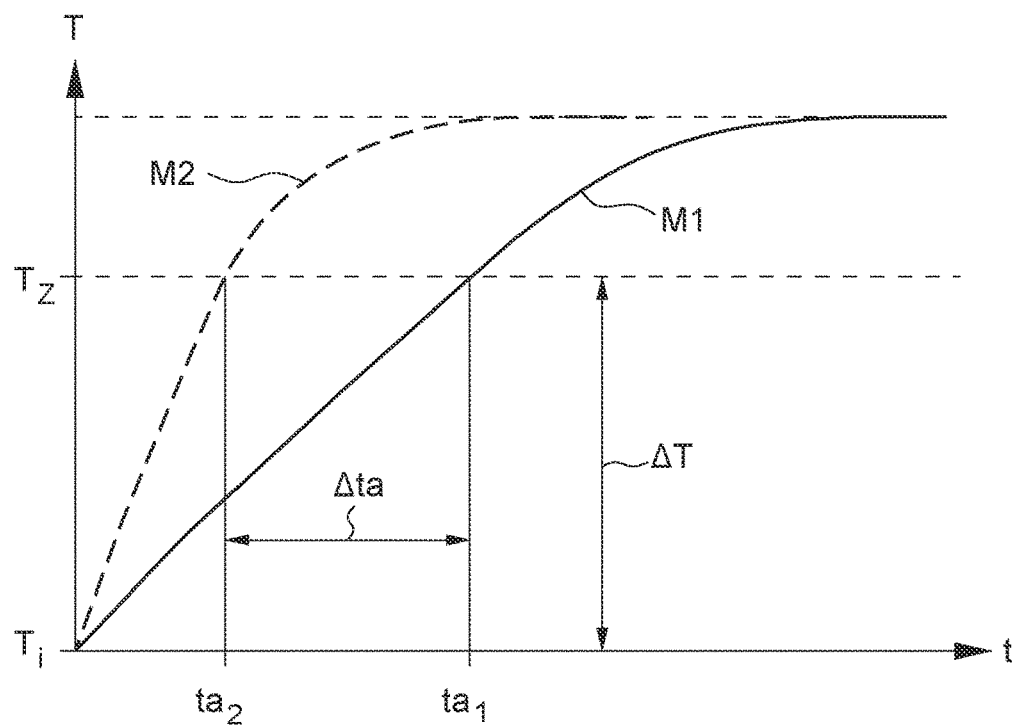
FIG. 4 is a schematic diagram with an exemplary course of the temperature of a food when heating the food as a function of time.

FIG. 4 shows a schematic diagram with an exemplary course of the temperature T of a food as a function of the time t when the food is heated. The solid line is the temperature curve of a first or recipe quantity M1 and the dashed line is the temperature curve of a second or scaled quantity M2, wherein the scaled quantity M2 is smaller than the recipe quantity M1.

For the recipe quantity M1, a heating time ta1 is required to reach the temperature Tz. For the scaled quantity M2, a shorter heating time ta2 is required to reach the temperature Tz. The heating time ta is consequently reduced due to the scaling by the amount/heating time change Δta.

The heating time ta depends on the heating power P of the kitchen appliance, the heat capacity C/specific heat capacity c of the food, the quantity M2 of the food, the actual temperature Ti of the food and the (preparation or target) temperature Tz of the preparation step Z, particularly preferably (approximately) according to the following equation:

$$ta=(C\Delta T)/P,$$

with C in particular in [J/K] as the heat capacity of the food, ΔT in particular in [K] as the temperature increase to be effected and P in particular in [W] as the effective heating power of the kitchen appliance.

The heat capacity C is the product of the specific heat capacity c in particular in [J/(kg K)] of the food and the (scaled) quantity M2 in particular in [kg] of the food.

In the case of a plurality of food items, the heat capacities $C_i$ of the individual food items are added to calculate the total heat capacity C, especially preferably according to the following equation:

$$C=\Sigma_i C_i=\Sigma_i(M2_i c_i)$$

The specific heat capacity c of the food can be taken in particular from the food database 6L and/or—in particular in the case of foods with a plurality of components/ingredients—calculated on the basis of nutritional data in the food database 6L, preferably according to the following equation:

$$c=\Sigma_i c_i x_i,$$

where x is the mass fraction of the component/ingredient of the food.

The required temperature increase ΔT is the difference between the target temperature Tz and the actual temperature Ti of the food.

The actual temperature Ti of the food is the temperature of the food at the beginning of the preparation step Z. In particular, the actual temperature Ti of the food depends on the preparation history and/or the previous preparation steps Z. Preferably, the actual temperature Ti is greater than the ambient room temperature.

A food heated in a previous preparation step Z cools down with time and/or with each subsequent preparation step Z, in particular if no reheating and/or addition of (additional) heated food items takes place.

Approximately, the temperature of the food reduces with each preparation step Z and/or with time by a (constant) cooling rate rc, particularly preferably approximately according to the following equation:

$$Ti=Tm-Nrc \text{ or } Ti=Tm-\Delta t_N rc,$$

with Tm in particular in [K] as the temperature of the food immediately after the last temperature-increasing preparation step Z, N as the number of preparation steps Z after the last temperature-increasing preparation step Z and/or since reaching the temperature Tm up to the present preparation step Z, $\Delta t_N$ in particular in [s] as the time (span) between the last temperature-increasing preparation step Z and/or since reaching the temperature Tm up to the current (point in) time, and rc in particular in [K] or [K/s] (>0) as the effective cooling rate per preparation step Z or time (span) $\Delta t_N$.

The (average) time (span) $\Delta t_N$ that has elapsed since the last temperature-increasing preparation step Z can be specified in the recipe R and/or determined or estimated (automatically) on the basis of the recipe R and/or the number N of preparation steps Z, in particular wherein the value for the usual/average time (span) $\Delta t_N$ is determined empirically. Additionally or alternatively, it is possible to (automatically) measure the time (span) $\Delta t_N$ and/or the actual temperature Ti of the food, preferably by means of the kitchen machine 1, in particular the data processing device 10R.

The temperature Tm can be the target temperature Tz of the last temperature-increasing preparation step Z and/or of a previous preparation step Z in which heating of the food took place.

However, the temperature Tm can also be a mixing temperature obtained by mixing a plurality of food items, preferably (approximately) according to the following equation:

$$Tm=[\Sigma_i(C_i T_i)]/[\Sigma_i C_i],$$

with $C_i$ in particular in [J/K] as heat capacities and $T_i$ in particular in [K] as temperatures of the individual food items mixed together.

The temperature increase $\Delta T$ to be achieved or required is thus (approximately) given by the following equation:

$$\Delta T = Tz - Ti = Tz - [\Sigma_i(C_i T_i)/\Sigma_i C_i] + Nrc$$

or $$\Delta T = Tz - Ti = Tz - [\Sigma_i(C_i T_i)/\Sigma_i C_i] + \Delta t_N rc.$$

However, the temperature increase $\Delta T$ to be achieved or required can also be estimated (approximately) according to the following equation:

$$\Delta T = Tz - Tm.$$

Based on the required temperature increase $\Delta T$, the specific heat capacity c, the scaled quantity M2 and the power P of the kitchen appliance, the heating time ta can then be set or adjusted.

Preferably, for the (computing) operation O1 and/or for setting/adjusting the heating time ta, the specific heat capacity c and/or the mass fraction x of the food components/ingredients are/is (automatically) retrieved from the food database 6L and/or the heating power P is (automatically) retrieved from the appliance database 6G and/or the actual temperature Ti, the target temperature Tz, the time span $\Delta t_N$, the cooling rate rc and/or the number of preparation steps N are/is (automatically) retrieved from the recipe database 6R, as indicated by dashed lines in FIG. 3.

Preferably, the setting or adjustment of the heating time ta and/or the scaling is carried out for all food items to be heated and/or preparation steps Z of the recipe R. However, it is possible that certain food items and/or preparation steps Z are excluded from an adjustment of the heating time ta and/or scaling and/or that the scaling performed—in particular in a subsequent (computing) operation O2—is reversed/withdrawn.

In particular, a minimum amount/quantity $M_{min}$ may be provided for one or more food items and/or one or more preparation steps Z, which must not be undershot even by or after scaling.

For example, a minimum amount/quantity $M_{min}$, of fat of 20 g may be specified during frying/sautéing to prevent the food from burning.

Figure 5:
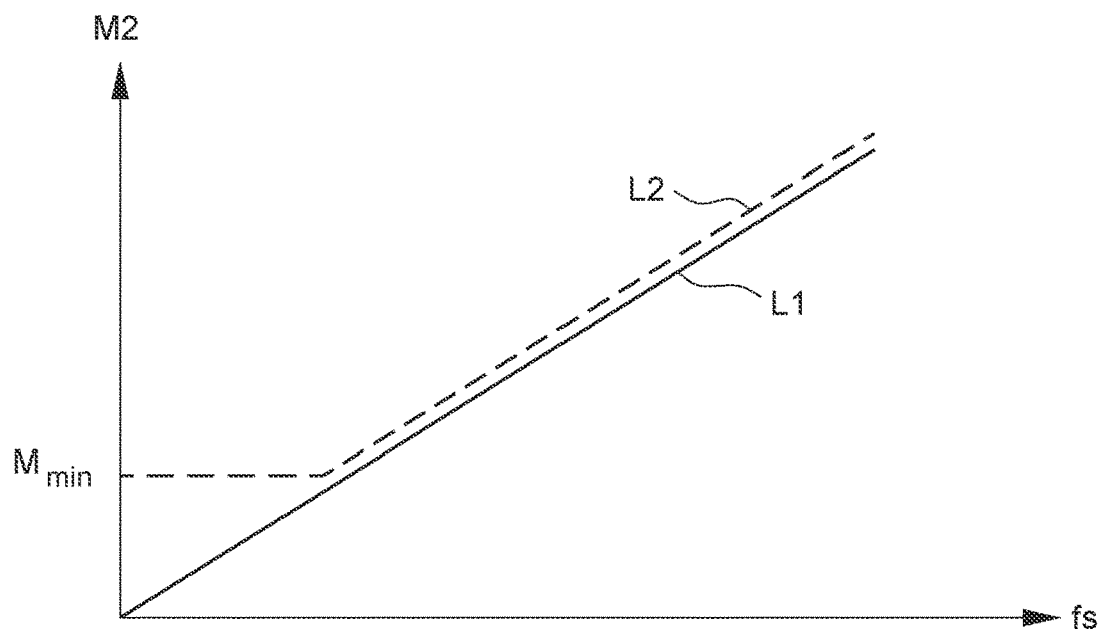
FIG. 5 is a schematic diagram with an exemplary course of the scaled quantity of a food as a function of a scaling factor.

FIG. 5 shows a schematic diagram with an exemplary course of the scaled quantity M2 of a food as a function of the scaling factor fs. The solid line shows the exemplary course of the scaled quantity M2 of a first food (food identifier L1) and the dashed line the exemplary course of the scaled quantity M2 of a second food (food identifier L2). The quantity M2 of the first food is scalable without restrictions. The quantity M2 of the second food, however, is only scalable down to a lower threshold or a defined minimum quantity $M_{min}$, which must not be undershot regardless of the scaling factor fs.

In the case of undershooting/falling below the minimum quantity $M_{min}$, by means of the scaling, the minimum quantity $M_{min}$, is preferably used to set or adjust the heating time ta. However, it is also possible in principle to use the scaled quantity M2 to set or adjust the heating time ta despite undershooting/falling below the minimum quantity $M_{min}$, by means of the scaling, in particular if the effects on the setting or adjustment of the heating time ta are negligibly small.

In the case of steaming, a setting or adjustment of the heating time ta is preferably carried out as in the case of boiling, preferably in the (computing) operation O3.

However, it is possible that, in particular because of the uniform distribution of the steam in the cooking chamber and the overall poorer heat transfer during steaming compared to boiling, the heating time ta does not need to be changed or only needs to be changed if the scaling factor fs exceeds and/or falls below a threshold value, for example if the scaling factor fs is more than 1.5 and/or less than 0.5.

If no adjustment of the heating time ta is carried out during steaming, the recipe quantity M1 of the steam-generating food (item), usually water, is preferably not scaled or the scaling made is reset to the original value M1 or to the quantity according to the recipe.

If, during steaming, the recipe quantity M1 of the steam-generating food item is also reduced/decreased and/or the scaling factor fs falls below the threshold value, a minimum quantity $M_{min}$, for the steam-generating food item must preferably also be maintained, which must also not be undershot by or after scaling, in particular in order to avoid complete vaporization of the steam-generating food item.

In addition or alternatively, the vaporization rate rv, the specific enthalpy of vaporization h of the steam-generating food and/or the power P of the kitchen appliance may be taken into account when scaling the recipe quantity M1 of the steam-generating food, in particular to prevent complete vaporization of the steam-generating food.

The scaled quantity M2 of the steam-generating food can be determined approximately according to the following equation:

$$M2 \geq rv \cdot ta2 \approx (P/h) ta2,$$

with M2 in particular in [kg] as the scaled quantity of the steam-generating food, ta2 in particular in [s] as the heating time, rv in particular in [kg/s] (>0) as the vaporization rate, h in particular in [kJ/kg] as the specific enthalpy of vaporization of the steam-generating food, and P in particular in [W] as the (effective) heating power.

In the case where the steam-generating food is used as part of the prepared food, dish or meal, for example as a sauce, the recipe quantity M1 of the steam-generating food is preferably also to be scaled when the recipe quantity M1 of the food to be steamed is scaled.

Preferably, when scaling the recipe quantity M1 of the steam-generating food, the ratio of the amount/quantity of the steam-generating food remaining after steaming, hereinafter referred to as the remaining quantity, to the amount/quantity M1 of the food to be steamed should be kept equal, preferably according to the following equation:

$$Mr2/Md2 = Mr1/Md1 \text{ or } Mr2 = (Md2/Md1)Mr1,$$

with Mr2 in particular in [kg] or [l] as the scaled remaining quantity of the steam-generating food, Md2 in particular in [kg] or [l] as the scaled quantity of the food to be steamed, Mr1 in particular in [kg] or [l] as the remaining quantity of the steam-generating food according to the recipe and Md1 in particular in [kg] or [l] as the quantity of the food to be steamed according to the recipe.

In particular, in order to prevent complete vaporization, the vaporization rate rv, the specific enthalpy of vaporization h and/or the (effective) heating power P should preferably be taken into account in this case, especially preferably according to the following equation:

$$M2 = Mr2 + rv \cdot ta2 \approx Mr2 + (P/h) ta2,$$

with M2 in particular in [kg] or [l] as the scaled quantity of the steam-generating food, Mr2 in particular in [kg] or [l] as the scaled remaining quantity of the steam-generating food, rv in particular in [kg/s] or [l/s] (>0) as the vaporization rate, ta2 in particular in [s] as the adjusted/scaled heating time, h in particular in [kJ/kg] as the specific enthalpy of vaporization of the steam-generating food, and P in particular in [W] as (effective) heating power.

Preferably, for the (computing) operation O3 and/or for the scaling of the quantity M1 of the steam-generating food and/or for the calculation of the scaled quantity M2 of the steam-generating food, the vaporization rate rv and/or the specific enthalpy of vaporization h are/is (automatically) retrieved from the food database 6L, and/or the heating power P is (automatically) retrieved from the appliance database 6G, and/or the remaining quantity Mr1 of the steam-generating food according to the recipe and/or the recipe quantity Md1 of the food to be steamed are/is (automatically) retrieved from the recipe database 6R, as indicated by dashed lines in FIG. 3.

If there is no heating and/or the (target or preparation) temperature Tz of the preparation step Z is lower than the threshold temperature, it is preferably checked subsequently and/or by means of a third branching/decision D3 whether chopping or mixing is taking place, for example on the basis of the recipe-specified rotational speed level and/or the rotational speed of the electric motor 10E and/or by comparing the recipe-specified rotational speed level and/or rotational speed with a threshold level or threshold speed.

For example, chopping is when the recipe-specified rotational speed level is greater than or equal to 900, 1000, or 1100 rpm, and mixing is when the recipe-specified rotational speed level is less than 900, 1100, or 1200 rpm.

In the case of chopping, the chopping time tz is preferably set or adjusted to the scaling of the recipe R and/or to the scaled quantity M2 in a (computing) operation O4.

The chopping time tz is the time for which a food is chopped or pureed in a preparation step Z of the recipe R by means of the kitchen system 100, in particular the kitchen machine 1, particularly preferably the stirrer 20R, in particular in order to achieve a predefined chopping result and/or a predefined piece size distribution.

Preferably, the chopping time tz increases with an increase of the recipe quantity M1 and/or with a scaling factor fs greater than 1 and/or the chopping time tz decreases/reduces with a decrease/reduction of the recipe quantity M1 and/or with a scaling factor fs less than 1.

The chopping time tz2 of an increased quantity M2 is consequently greater and the chopping time tz2 of a decreased/reduced quantity M2 smaller than the chopping time tz1 of the recipe quantity M1.

Figure 6:
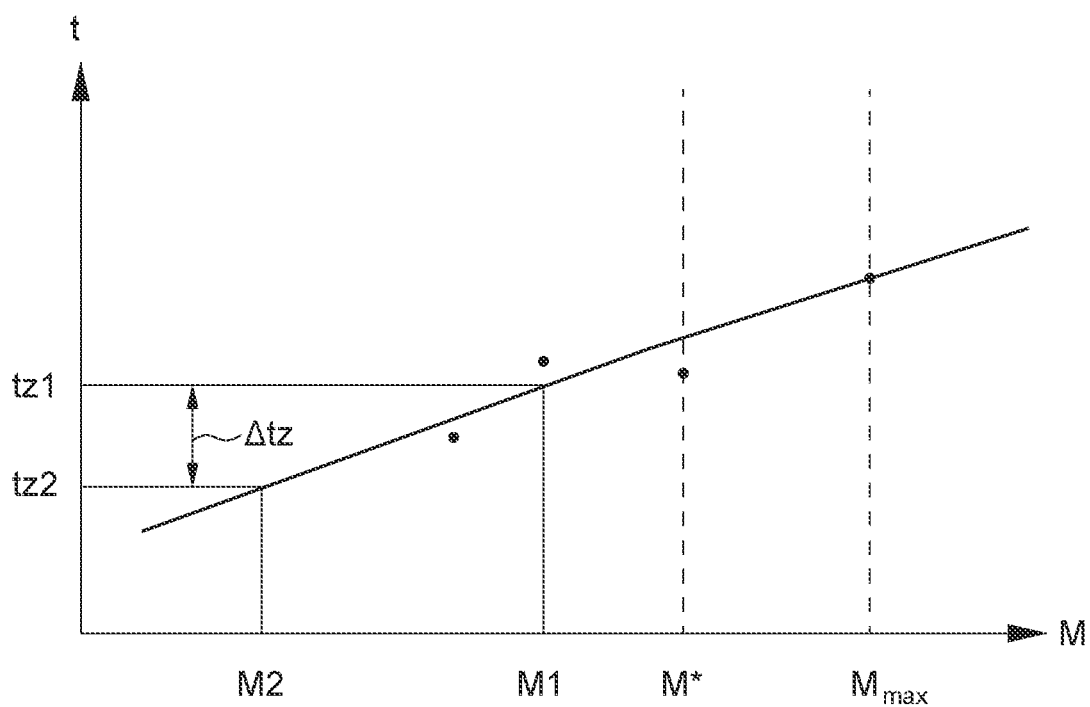
FIG. 6 is a schematic course of the time required for chopping of a food as a function of the quantity.

FIG. 6 shows a schematic course of the chopping time tz as a function of the quantity M of the food to be chopped.

For the recipe quantity M1, a chopping time tz1 is required in order to achieve a desired piece size distribution.

For the scaled or smaller quantity M2, a shorter chopping time tz2 is required to achieve the same piece size distribution.

The recipe-specified chopping time tz1 is consequently reduced due to the scaling by the amount Δtz, in particular without changing the preparation result or chopping result.

The relationship between the chopping time tz and the quantity M is preferably determined experimentally and/or empirically for one or more foods and/or powers of the kitchen machine 1.

The chopping time tz depends in particular on the power and/or rotational speed or rotation stage of the kitchen machine 1 or of the electric motor 10E, the quantity M1 and/or M2 of the food and/or the type of food, in particular the physical structure of the food.

For a given power of the kitchen machine 1 or the electric motor 10E, the chopping time tz for a food can be determined (approximately) according to the following equation:

$$tz = Mfz,$$

with M in particular in [kg] as the quantity of food and fz in particular in [s/kg] as the chopping factor.

The correlation/relationship between the chopping time tz and the quantity M, in particular the chopping factor fz, is preferably determined experimentally and/or empirically, as indicated by the four measuring points in FIG. 6.

Preferably, the relationship and/or the chopping factor fz for one or more foods, powers and/or rotational stages or rotational speeds of the electric motor 10E is stored in the database system 6, in particular the food database 6L. However, it is also possible that the relationship and/or the chopping factor fz for one or more foods, powers and/or rotational stages or rotational speeds of the electric motor 10E is stored in a separate chopping database.

It has been found that the same relationship and/or chopping factor fz can be used for a plurality of foods and/or that a uniform chopping factor fz can be assigned to a food group comprising a plurality of foods. In this way, the effort required to determine the relationship and/or chopping factor fz is reduced.

For the setting or adjustment of the chopping time tz and/or in the (computing) operation O4, the scaled quantity M2 of the food is multiplied by the chopping factor fz assigned to the food, preferably with the chopping factor fz being (automatically) retrieved from the database system 6, in particular the food database 6L, as indicated by dashed lines in FIG. 3.

In the case of mixing, the mixing time tm is preferably also adjusted to the scaled quantity M of the food in a (computing) operation O5. Preferably, an empirically or experimentally determined correlation/relationship between the mixing time tm and the quantity M of the food, in particular a mixing factor fm, is used and/or (automatically) retrieved from the database system 6, in particular the food database 6L.

It has been found that mixing is comparatively insensitive to variations in quantity compared to the other groups of preparation. If the recipe quantity M1 is decreased/reduced and/or if the scaling factor fs is less than 1, adjustment of the mixing time tm may be omitted.

If the recipe quantity M1 is increased and/or if the scaling factor fs is greater than 1, the mixing time tm1 should be increased, preferably by means of a mixing factor fm, in particular to ensure a consistent/unchanged mixing result.

Particularly preferably, when the recipe quantity M1 of the food is increased by 50%, the mixing time tm is increased by 10%, preferably according to the following equation:

$$tm2 = (M2/M1)tm1(1.1/1.5),$$

with tm2 in particular in [s] as adjusted mixing time, tm1 in particular in [s] as mixing time according to recipe, M1 in particular in [kg] as quantity according to the recipe and M2 in particular in [kg] as scaled quantity.

The (mathematical) relationships, equations, tables and/or diagrams for determining, setting or adjusting the preparation parameters, in particular the heating time ta, the chopping time tz and/or the mixing time tm, are preferably electronically stored or saved—for example as functional equations or tables—in the data processing device 10R, particularly preferably a memory of the data processing device 10R.

If certain data, specifications, items of information, values, characteristics and/or parameters, in particular concerning a food to be used, are not available, cannot be retrieved and/or are incorrect, preferably preset (standard) values, characteristics and/or parameters are used. For example, in the case of missing information on the specific heat capacity of a food, the specific heat capacity of water, i.e. approximately 4 kJ/(kg K), can be used. In this way, the error-proneness of the proposed method is reduced.

As already explained, all preparation steps Z of the recipe R are checked with regard to a possible setting or adjustment of the preparation parameters.

In particular, after the setting or adjustment of a preparation parameter—on the basis of a further or fourth or last branching/decision D4—it is checked whether a further preparation step Z is present/provided.

Once all preparation steps Z have been checked and, if necessary, adjusted, the fifth method step S5 or the setting or adjustment of the preparation parameters is completed.

In a further or sixth method step S6, a plausibility check is carried out and/or it is automatically checked whether the recipe R can be carried out with the set or adjusted preparation parameters. In particular, it is automatically checked whether the preparation step(s) Z can be carried out with the scaled quantity M2.

Preferably, it is automatically checked whether the scaled quantity M2 of indivisible foods, such as eggs, is only present in integer multiples.

Preferably, it is automatically checked whether the quantities displayed by means of the user interface 10U are displayed rounded and/or with the predefined unit of measurement. The measurement units, measurement unit types and/or conversion factors for the measurement units can be stored in the database system 6, in particular in a measurement unit database.

Preferably, it is automatically checked whether the kitchen appliance used, in particular the vessel 20 of the kitchen machine 1, can hold/receive the scaled quantity M2 and/or is overfilled or underfilled, preferably by comparing the (holding) capacity V of the kitchen appliance with the scaled quantity M2 of the food, wherein the density of the food may be taken into account.

Preferably, (food-specific) maximum quantities $M_{max}$ can be specified for one or more kitchen appliances and/or one or more preparation steps Z, in particular wherein the scaled quantity M2 is compared with a maximum quantity $M_{max}$ of the kitchen appliance to be used and/or a maximum quantity $M_{max}$ for the preparation steps Z in order to check whether the preparation steps Z can be carried out.

For example, a (first) maximum quantity $M_{max}$ may be specified for the chopping and/or mixing, wherein the chopping step Z can only be carried out up to the maximum quantity $M_{max}$ or, if the maximum quantity $M_{max}$ is exceeded, the intended preparation result can no longer be achieved.

In addition, values or ranges may be specified at which an execution of the preparation step Z can only be carried out under certain conditions and/or with additional measures.

For example, a scaled quantity M2 of a food that exceeds a predefined value or a predefined threshold quantity M*, but is smaller than the maximum quantity $M_{max}$, can still be chopped if a spatula/scraper is used. Such threshold values are shown in the diagram according to FIG. 6.

Preferably, the plausibility check is carried out after completion of the setting or adjustment of the preparation parameters for all preparation steps Z. However, it is also possible that the plausibility check is carried out additionally or alternatively after each preparation step Z and/or each setting or adjustment of the preparation parameters.

If the plausibility check is negative and/or the preparation step(s) Z cannot be performed with the scaled quantity M2, an error message, for example, is output to a user preferably via the user interface 10U of the kitchen system 100, particularly preferably the display device 10D, and/or an alternative, in particular a highest possible, scaled quantity M2 is calculated and indicated.

In an optional seventh method step S7, (automatic) language correction is performed, in particular to display the information by means of the user interface 10U correctly in terms of language.

In a further or eighth or final method step S8, the scaled/adjusted recipe R is preferably output or displayed to a user, in particular via the user interface 10U of the kitchen system 100, especially preferably the display device 10D.

In the following, a particularly preferred method variant is described in which—in particular in addition to the setting or adjustment of the preparation parameter(s)—one or more kitchen appliances to be used for the preparation are automatically set or selected, in particular (exclusively) by means of the data processing device 10R.

As already explained at the beginning, one or more kitchen appliances to be used for the preparation is/are preferably set or selected automatically as a function of the scaled quantity M2 and using the appliance parameter(s) and/or the appliance database 6G, in particular by (systematically) comparing the capacity V and/or the maximum quantity $M_{max}$ of the kitchen appliances with the scaled quantity M2 of the food.

With the proposed method, the number and/or the usage of the kitchen appliances used is preferably adjusted and/or optimized to a change in quantity and/or to the scaled quantity M2, in particular in order to reduce or minimize the (total) preparation time and/or the resources required and/or the energy consumption.

As explained above, the appliance database 6G comprises one or more appliance parameters for the (different) kitchen appliances of the kitchen system 100.

Preferably, the appliance parameters for the kitchen appliances of the kitchen system 100 are already stored in the appliance database 6G at the factory.

Additionally or alternatively, a user may add one or more kitchen appliances and/or data sets and/or appliance parameters to the appliance database 6G, in particular via the user interface 10U.

Furthermore, it is possible that individual or all kitchen appliances of the kitchen system 100 are coupled or can be coupled to one another (in terms of data connections) and/or that new kitchen appliances automatically or self-actingly connect (in terms of data connections) to the database system 6 and/or the appliance database 6G, in particular in such a way that the database system 6 and/or the appliance database 6G is supplemented by the appliance parameters of the (new) kitchen appliance.

As already explained, an appliance parameter can be a technical and/or food-specific function and/or property. For example, an appliance parameter can be a capacity V and/or a maximum quantity $M_{max}$ for a specific food or food group and/or for a technical or appliance-specific function, such as a heating function, a chopping function and/or a mixing function.

However, the (food-specific) maximum quantity $M_{max}$ of the kitchen appliances can also be determined using the food database 6L and/or by means of a food parameter, in particular the (bulk) density, the sugar content and/or starch content and/or the degree of swelling, and/or the capacity V of the kitchen appliance, for determining, setting or selecting the kitchen appliance to be used.

Against this background, the food database 6L or a food parameter of the food database, in particular the (bulk) density, the starch content and/or sugar content and/or the degree of swelling, is optionally used—in addition to the appliance database 6G and/or the appliance parameter—when determining, setting or selecting the kitchen appliance to be used, in particular in order to determine together with the capacity V as appliance parameter the food-specific maximum quantity $M_{max}$ of the kitchen appliance.

The determination, setting or selection of the kitchen appliance(s) to be used for the preparation is preferably carried out immediately after the scaling of the recipe quantity M1 (fourth method step S4) and/or immediately before the setting or adjustment of the preparation parameter(s) as a function of the scaled quantity M2 (fifth method step S5).

As already explained at the outset, the recipe R contains an indication of the recipe-specified or preset kitchen appliance for one or more preparation steps Z.

In particular for the case that no scaling of the recipe quantity M1 takes place, it is automatically and/or (exclusively) by means of the data processing device 10R checked whether an alternative and/or additional kitchen appliance to the recipe-specified kitchen appliance is to be used or can be used, preferably in order to reduce or minimize the energy consumption and/or the preparation time.

If, for example, a preparation step Z is present multiple times in the recipe R and/or the recipe R has repetitive or identical preparation steps Z, it is preferably automatically checked whether an alternative kitchen appliance with a larger capacity V and/or a larger maximum quantity $M_{max}$ can be used compared to the recipe-specified kitchen appliance.

In the event that an alternative kitchen appliance with a larger capacity V and/or a larger maximum quantity $M_{max}$ can be used, the repetitive or identical preparation steps Z are preferably combined and/or carried out in one preparation step Z with the alternative kitchen appliance.

For example, the recipe R may provide for a sequential preparation of several partial quantities of a food by means of a recipe-specified kitchen appliance, in order to prepare the total quantity of the food in a plurality of sequential preparation steps Z. In this case, an alternative kitchen appliance with a larger capacity V and/or a larger maximum quantity $M_{max}$ compared to the recipe-specified kitchen appliance is preferably selected, if available, in order to prepare the entire quantity of the food in a single preparation step Z.

This method, in particular the combination of a plurality of preparation steps Z, allows subsequent preparation steps Z to be brought forward in time. In this way, the total preparation time is reduced.

In addition, it is possible that the recipe-specified kitchen appliance freed up by the use of the alternative kitchen appliance is now (simultaneously) used elsewhere or for another or subsequent preparation step Z, in particular in such a way that the other or subsequent preparation step Z is brought forward in time and/or a plurality of preparation steps Z are carried out in parallel.

In the case of a quantity reduction and/or with a scaling factor fs smaller than 1, it is preferably automatically checked whether a smaller kitchen appliance than the recipe-specified kitchen appliance or a kitchen appliance with a smaller capacity V and/or a smaller maximum quantity $M_{max}$ than the capacity V or the maximum quantity $M_{max}$ of the recipe-specified kitchen appliance can be used or is to be used, in particular by (systematically) comparing the capacity V and/or the maximum quantity $M_{max}$ of the kitchen appliances with the scaled quantity M2 of the food.

In the case that a smaller kitchen appliance can be used, the smaller kitchen appliance is selected and/or the preparation step Z is performed using the smaller kitchen appliance.

Particularly preferably, the smallest possible kitchen appliance is automatically selected and/or the kitchen appliance with the smallest capacity V and/or the smallest maximum quantity $M_{max}$ that is still sufficient for the preparation of the scaled quantity M2 is selected. In this way, the resources required, in particular the energy consumption, is reduced compared to the use with the recipe-specified kitchen appliance.

Preferably, following the determination, setting or selection of the alternative, in particular smaller, kitchen appliance, the preparation parameters are automatically set or adjusted as a function of the scaled quantity M2 and using the food parameter, as already explained.

In the case of an increase in quantity and/or if the scaling factor fs is greater than 1, it is preferably automatically checked whether the recipe-specified kitchen appliance can still be used or can also be used for the scaled quantity M2, in particular by comparing the capacity V and/or the maximum quantity $M_{max}$ of the recipe-specified kitchen appliance with the scaled quantity M2 of the food.

In the case that the preparation of the scaled quantity M2 can be performed by means of the recipe-specified kitchen appliance, preferably the preparation parameter is then automatically set or adjusted depending on the scaled quantity M2 and using the food parameter, as already explained.

In the case that the recipe-specified kitchen appliance can no longer be used for the scaled quantity M2, and/or if the capacity V and/or the maximum quantity $M_{max}$ of the recipe-specified kitchen appliance is too small for the scaled quantity M2, it is preferably automatically checked whether a larger kitchen appliance and/or a kitchen appliance with a larger capacity V and/or a larger maximum quantity $M_{max}$ and/or an additional kitchen appliance to the recipe-specified kitchen appliance can be used or is to be used, in particular in order to prepare the scaled quantity M2 in a single preparation step Z.

Preferably, it is first automatically checked by a (systematic) comparison of the capacity V and/or the maximum quantity $M_{max}$ of the kitchen appliances with the scaled quantity M2 whether a larger kitchen appliance and/or a kitchen appliance with a larger capacity V and/or a larger maximum quantity $M_{max}$ can be used or is to be used.

In the case that a larger kitchen appliance can be used or is to be used, the larger kitchen appliance is preferably selected automatically and/or the preparation step Z is carried out by means of the larger kitchen appliance.

Particularly preferably, the next larger kitchen appliance is automatically selected, and/or the kitchen appliance with the smallest capacity V and/or the smallest maximum quantity $M_{max}$ that is still sufficient for preparing the scaled quantity M2 in a single preparation step Z is automatically selected.

Consequently, the method can prevent that the recipe-specified kitchen appliance has to be used multiple times and thus the preparation time increases. In particular, the number of preparation steps Z can be reduced.

In addition, the recipe-specified kitchen appliance can be used for another and/or subsequent preparation step Z by using an alternative kitchen appliance, in particular in such a way that the other and/or subsequent preparation step Z is brought forward in time and/or a plurality of preparation steps Z are carried out in parallel. In this way, the preparation time is reduced.

Particularly preferably, during or after the selection of an alternative kitchen appliance, it is automatically checked whether the recipe-specified kitchen appliance—freed up by the use of an alternative kitchen appliance—can be used for another and/or subsequent preparation step Z, in particular in order to parallelize a plurality of preparation steps Z.

In the case that the recipe-specified kitchen appliance can be used or is to be used for another and/or subsequent preparation step Z, the other and/or subsequent preparation step Z is preferably carried out—particularly preferably in parallel—by means of the recipe-specified kitchen appliance.

In addition or alternatively, it is automatically checked whether an additional kitchen appliance can be used or is to be used in addition to the recipe-specified kitchen appliance, in particular if no larger kitchen appliance can be used, in order to prepare the scaled quantity M2 at the same time and/or in a single preparation step Z, and/or in order to prepare the scaled quantity M2 by means of the recipe-specified kitchen appliance and the additional kitchen appliance at the same time and/or in a single preparation step Z.

In the case that an additional kitchen appliance can be used in addition to the recipe-specified kitchen appliance, the additional kitchen appliance is preferably selected automatically and the scaled quantity M2 is prepared by means of the recipe-specified kitchen appliance and the additional kitchen appliance, in particular at the same time and/or in a single preparation step Z.

Preferably, following the selection of an alternative and/or additional kitchen appliance to the recipe-specified kitchen appliance, the preparation parameter(s) is/are automatically set as a function of the scaled quantity M2 and using the food parameter(s), as explained above.

The proposed method makes it possible to prepare a quantity M2 of a food that has been scaled and/or adjusted compared to a recipe-specified quantity M1 in such a way that the preparation result, by automatic adaptation of the preparation parameter(s), has a consistent/constant quality compared to the preparation of the recipe-specified quantity M1 and, moreover, the energy consumption and/or the total preparation time is reduced or minimized by the optimized use of the kitchen appliances.

Individual aspects, features, method steps and method variants of the present technology can be implemented independently, but also in any combination and/or sequence.

In particular, the present technology relates also to any one of the following aspects which can be realized independently or in any combination, also in combination with any aspects described herein.

1. Method for operating a kitchen system 100 for at least partially automated preparation of food,
   wherein a database system 6 is used comprising a recipe database 6R having a plurality of recipes R for preparing food,
   wherein the recipes R of the recipe database 6R each contain an indication of a recipe quantity M1 of the food and a preparation parameter for one or more preparation steps Z,
   wherein the kitchen system 100 performs the preparation of the food based on the preparation parameter at least partially automatically, and
   wherein, based on a user input, a recipe R is selected from the recipe database 6R and the recipe quantity M1 of the food is scaled,
   characterized
   in that the database system 6 comprises a food database 6L with at least one food parameter for the food, wherein the preparation parameter is automatically determined as a function of the scaled quantity M2 and using the food parameter, and/or
   in that the database system 6 comprises an appliance database 6G with at least one appliance parameter for a plurality of kitchen appliances, wherein a kitchen appliance to be used for the preparation is automatically determined as a function of the scaled quantity M2 and using the appliance parameter.
2. Method according to aspect 1, characterized in that the preparation parameter is a heating time ta for a preparation step Z and/or in that a preparation step Z of the recipe R comprises heating the food for a heating time ta.
3. Method according to aspect 2, characterized in that the food parameter is a specific heat capacity c of the food and is used to determine the heating time ta, in particular wherein the specific heat capacity c is calculated using nutritional data in the food database 6L.
4. Method according to aspect 2 or 3, characterized in that the actual temperature $T_i$ of the food at the beginning of the preparation step Z is determined in order to determine the heating time ta.
5. Method according to aspect 4, characterized in that the actual temperature $T_i$ is determined on the basis of the number N of previous preparation steps Z, a cooling rate rc and/or a mixing temperature $T_m$ established by mixing a plurality of foods.
6. Method according to one of the preceding aspects, characterized in that when scaling the recipe quantity M1, the vaporization rate rv of the food is used as food parameter, the specific enthalpy of vaporization h of the food is used as food parameter and/or the power P of the kitchen appliance is used as appliance parameter.
7. Method according to one of the preceding aspects, characterized in that the recipe R contains an indication of a minimum quantity $M_{min}$ of the food for one or more preparation steps Z and/or the appliance database 6G contains an indication of a capacity V and/or a maximum quantity $M_{max}$ of the food for one or more kitchen appliances, preferably wherein the scaled quantity M2 is at least as large as the minimum quantity $M_{min}$, and/or at most as large as the maximum quantity $M_{max}$.
8. Method according to one of the preceding aspects, characterized in that the preparation parameter is a chopping time tz for a preparation step Z and/or in that a preparation step Z of the recipe R comprises chopping the food for a chopping time tz.
9. Method according to aspect 8, characterized in that a preferably empirically determined relationship between the chopping time tz and the quantity M of the food, in particular a chopping factor fz, from the database system 6, in particular the food database 6L, is used to determine the chopping time tz.
10. Method according to one of the preceding aspects, characterized in that the preparation parameter is a mixing time tm for a preparation step Z and/or in that a preparation step Z of the recipe R comprises mixing the food for a mixing time tm, wherein a preferably empirically determined relationship between the mixing time tm and the quantity M of the food, in particular a mixing factor fm, from the database system 6, in particular from the food database 6L, is used to determine the mixing time tm.

11. Method according to one of the preceding aspects, characterized in that the kitchen appliances in the appliance database 6G are each assigned at least one technical and/or food-specific function and/or property, a power P, a temperature range, a capacity V and/or a maximum quantity $M_{max}$ of a food and/or a food group as appliance parameters.

12. Method according to one of the preceding aspects, characterized in that the recipes R of the recipe database 6R each contain an indication of a recipe-specified kitchen appliance, wherein it is automatically checked, as a function of the scaled quantity M2 and using a capacity V and/or a maximum quantity $M_{max}$ as appliance parameter, whether an alternative and/or additional kitchen appliance to the recipe-specified kitchen appliance is to be used.

13. Method according to aspect 12, characterized in that, in the case of a quantity reduction, it is checked whether a smaller kitchen appliance than the recipe-specified kitchen appliance is to be used, and/or that, in the case of a quantity increase, it is checked whether the recipe-specified kitchen appliance can still be used or a larger and/or additional kitchen appliance to the recipe-specified kitchen appliance is to be used.

14. Kitchen system 100 for at least partially automatic preparation of food,
wherein the kitchen system 100 comprises a user interface 10U and a data processing device 10R,
wherein the data processing device 10R is data-connected or connectable to a recipe database 6R comprising a plurality of recipes R, a food database 6L comprising at least one food parameter for the food and/or an appliance database 6G comprising at least one appliance parameter for a plurality of kitchen appliances,
wherein a recipe R of the recipe database 6R is selectable via the user interface 10U, and
wherein the kitchen system 100 comprises a control device 10S for executing a recipe R of the recipe database 6R at least partially automatically,
characterized
in that the kitchen system 100 is designed for carrying out the method according to one of the preceding aspects.

15. Computer program product comprising instructions which, when the program is executed by a data processing device 10R, cause the data processing device to perform the method of any one of aspects 1 to 13.

| List of reference signs: | | | |
|---|---|---|---|
| 100 | Kitchen system | 10X | First electrical connection |
| 1 | Kitchen machine | 10Y | Second electrical connection |
| 2 | Mixer/Blender | 20 | Vessel |
| 3(A-C) | Pot | 20B | Bottom |
| 4(A-C) | Pan | 20D | Lid |
| 5 | Mobile device | 20G | Handle |
| 6 | Database system | 20H | Heating system |
| 6G | Appliance database | 20R | Stirrer |
| 6L | Food database | 20W | Wall |
| 6R | Recipe database | 20X | First electrical connection |
| 10 | Base station | 20Y | Second electrical connection |
| 10A | Receptacle | A | Central axis |
| 10B | Input device | C | Heat capacity |
| 10C | Power cord | c | Specific heat capacity |
| 10D | Display device | D(1-4) | Branching/Decision |
| 10E | Electric motor | fm | Mixing factor |
| 10K | Communication device | fs | Scaling factor |
| 10M | Measuring device | fz | Chopping factor |
| 10N | Power supply unit | G(1-4) | Appliance identifier |
| 10R | Data processing device | h | Specific enthalpy of vaporization |
| 10S | Control device | L(1-3) | Food identifier |
| 10U | User interface | M | Amount/Quantity |
| 10W | Shaft | M1 | Recipe quantity |
| M2 | Scaled quantity | ΔT | Temperature increase |
| $M_{min}$ | Minimum quantity | t | Time |
| $M_{max}$ | Maximum quantity | ta | Heating time |
| M* | Threshold quantity | ta1 | Recipe-specified heating time |
| Mr1 | Remaining quantity (recipe) | ta2 | Scaled heating time |
| Mr2 | Remaining quantity (scaled) | Δta | Heating time change |
| Md1 | Recipe quantity | $Δt_N$ | Time span |
| Md2 | Scaled quantity | tm | Mixing time |
| N | Number of preparation steps | tm1 | Recipe-specified mixing time |
| O(1-5) | (computing) operation | tm2 | Scaled mixing time |
| P | Power | tz | Chopping time |
| R | Recipe | tz1 | Recipe-specified chopping time |
| rc | Cooling rate | tz2 | Scaled chopping time |
| rv | Vaporization rate | Δtz | Chopping time change |
| S(1-8) | Method step | V | (Holding) capacity |
| T | Temperature | x | Mass fraction |
| Ti | Actual temperature | Z(1-3) | Preparation step |
| Tm | Mixing temperature | ZR | Preparation chamber |
| Tz | Target temperature | | |

The invention claimed is:

1. A method to operate a kitchen system for at least partially automated preparation of food comprising:
   connecting a data processing device to a database system comprising a recipe database with a plurality of recipes for preparing food and a food database with at least one food parameter for the food;
   selecting, based on a user input via a user interface, a recipe from the recipe database, wherein the plurality of recipes of the recipe database each contain an indication of a recipe quantity of the food and a preparation parameter for one or more preparation steps;
   specifying, based on another user input via the user interface, at least one of: the number of servings, and the number of persons for which the selected recipe is to be performed;
   automatically scaling, by the data processing device, the recipe quantity of the food based on at least one of the number of servings and persons;
   automatically setting or adjusting, by the data processing device, the preparation parameter as a function of the scaled quantity and by using the food parameter; and
   automatically providing an instruction, at least based on the set or adjusted preparation parameter, to one or more kitchen appliances of the kitchen system to automatically perform at least a portion of the preparation of the food, the automatic performing of the at least a portion of the preparation of the food including one or more of:
      automatically controlling a temperature of one or more of the one or more kitchen appliances of the kitchen system and a time for the food at the temperature,
      automatically controlling a rotational speed or time for an electric motor of one or more of the one or more kitchen appliances of the kitchen system,
      automatically controlling a rotational speed or time for a stirrer of one or more of the one or more kitchen appliances of the kitchen system, and
      automatically controlling a heating time or a heating power of a heating system of one or more of the one or more kitchen appliances of the kitchen system.

2. The method according to claim 1, wherein the preparation parameter is a heating time for a preparation step or wherein a preparation step of the recipe comprises heating the food for a heating time.

3. The method according to claim 2, wherein the food parameter is a specific heat capacity of the food and is used to determine the heating time.

4. The method according to claim 3, wherein the specific heat capacity is calculated using nutritional data in the food database.

5. The method according to claim 2, wherein an actual temperature of the food at a beginning of the preparation step is determined in order to determine the heating time, wherein the actual temperature is determined on the basis of at least one of the number of previous preparation steps, a cooling rate or a mixing temperature established by mixing a plurality of foods.

6. The method according to claim 1, wherein at least one of a vaporization rate of the food being used as food parameter and a specific enthalpy of vaporization of the food being used as food parameter, is used when scaling the recipe quantity.

7. The method according to claim 1, wherein the preparation parameter is a chopping time for a preparation step or wherein a preparation step of the recipe comprises chopping the food for a chopping time, wherein a relationship between the chopping time and the quantity of the food from the database system is used to determine the chopping time.

8. The method according to claim 1, wherein the preparation parameter is a mixing time for a preparation step or wherein a preparation step of the recipe comprises mixing the food for a mixing time, wherein a relationship between the mixing time and the quantity of the food from the database system is used to determine the mixing time.

9. A kitchen system adapted to at least partially automatically prepare food, comprising:
   a user interface and a data processing device, the data processing device configured to be data-connected or connectable to a recipe database comprising a plurality of recipes for preparing food, the recipes of the recipe database each containing an indication of a recipe quantity of the food and a preparation parameter for one or more preparation steps;
   the data processing device further configured to be data-connected or connectable to a food database comprising at least one food parameter for the food;
   wherein:
   a recipe of the recipe database is selectable via the user interface,
   at least one of the number of servings and a number of persons for which the selected recipe is to be performed can be specified via the user interface, and
   the kitchen system is configured to automatically scale the recipe quantity of the food based on at least one of the number of servings and the number of persons; and
   wherein the kitchen system is further configured to automatically set or adjust the preparation parameter, by the data processing device, as a function of the scaled quantity and by using the food parameter;
   the kitchen system comprising a control device configured to control, at least based on the set or adjusted preparation parameter, the one or more of the plurality of kitchen appliances to automatically perform at least a portion of a recipe from the recipe database, wherein the control includes one or more of:
      automatically controlling a temperature of the one or more of the plurality of kitchen appliances and a time for the food at the temperature,
      automatically controlling a rotational speed or a time for an electric motor of the one or more of the plurality of kitchen appliances,
      automatically controlling a rotational speed or time for a stirrer of the one or more of the plurality of kitchen appliances,
      automatically controlling a heating time or a heating power of a heating system of the one or more of the plurality of kitchen appliances.

* * * * *